(12) United States Patent
Pfohl et al.

(10) Patent No.: US 7,984,574 B2
(45) Date of Patent: Jul. 26, 2011

(54) CONSTRUCTION VEHICLE WITH REAR OBJECT DETECTION

(75) Inventors: Kevin L Pfohl, Potosi, WI (US); Gary S Honey, Dubuque, IA (US); Jahmy Jomont Hindman, Durango, IA (US); Douglas G. Meyer, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/059,631

(22) Filed: Mar. 31, 2008

(65) Prior Publication Data
US 2009/0229150 A1 Sep. 17, 2009

Related U.S. Application Data

(60) Provisional application No. 61/035,543, filed on Mar. 11, 2008.

(51) Int. Cl.
*E02F 5/02* (2006.01)
(52) U.S. Cl. ........................................................ 37/348
(58) Field of Classification Search .................... 37/301, 37/348; 172/2–7; 701/50; 414/694–723; 340/435, 436, 438, 666, 667, 561, 550, 555
See application file for complete search history.

(56) References Cited

U.S. PATENT DOCUMENTS

| | | | | |
|---|---|---|---|---|
| 4,873,644 A * | 10/1989 | Fujii et al. | | 700/219 |
| 5,793,308 A * | 8/1998 | Rosinski et al. | | 340/903 |
| 6,115,651 A | 9/2000 | Cruz | | |
| 6,247,538 B1 * | 6/2001 | Takeda et al. | | 172/2 |
| 6,933,837 B2 * | 8/2005 | Gunderson et al. | | 340/436 |
| 6,963,657 B1 * | 11/2005 | Nishigaki et al. | | 382/106 |
| 6,990,390 B2 * | 1/2006 | Groth et al. | | 700/180 |
| 7,366,595 B1 * | 4/2008 | Shimizu et al. | | 701/301 |
| 7,397,351 B1 * | 7/2008 | Rubin et al. | | 340/435 |
| 7,576,767 B2 * | 8/2009 | Lee et al. | | 348/36 |
| 7,640,107 B2 * | 12/2009 | Shimizu et al. | | 701/216 |
| 2003/0226290 A1 * | 12/2003 | Savard et al. | | 37/348 |
| 2005/0231341 A1 | 10/2005 | Shimizu | | |

FOREIGN PATENT DOCUMENTS

| | | |
|---|---|---|
| EP | 1522460 | 4/2005 |
| EP | 1538267 | 6/2005 |
| WO | WO 2005/080120 | 9/2005 |
| WO | WO 2006/006689 | 1/2006 |

OTHER PUBLICATIONS

Appendix 1—Back Up Camera Installation BMW 5-series (E39), NAV-TV Corp., early part of 2001, (4 pgs.), also available at www.NAV-TV.com.
User's Manual—Front and Rear Parking Sensor System, Model B-2661-08, HY Technologies, Milpitas, CA, Copyright 2006, download from http://www.backupsensors.net/cgi-bin/doc/2661-08-Display.pdf on Jul. 14, 2010.
European Search Report for EP 09154068 issued by the European Patent Office (5pages), Dated May 8, 2009.
Ultrasonic Rear Parking Assist (URPA) (3 pgs.), Applicant Admitted Prior Art.
VRBCS300W Wireless Back-Up Camera and Monitor, Virtual Reality Sound Labs (2 pgs.), 2006, available at http://roadmasterusa.com/manuals/VRBCS300W_eng.pdf.

* cited by examiner

*Primary Examiner* — Robert E Pezzuto
(74) *Attorney, Agent, or Firm* — Baker & Daniels LLP

(57) ABSTRACT

A vehicle, such as a loader, includes a chassis, a plurality of traction devices positioned to support the chassis, a tool supported by the chassis to move material, and a rear object detector. The object detector may be supported by the chassis of the vehicle and configured to detect objects around the vehicle.

22 Claims, 2 Drawing Sheets

FIG. 3
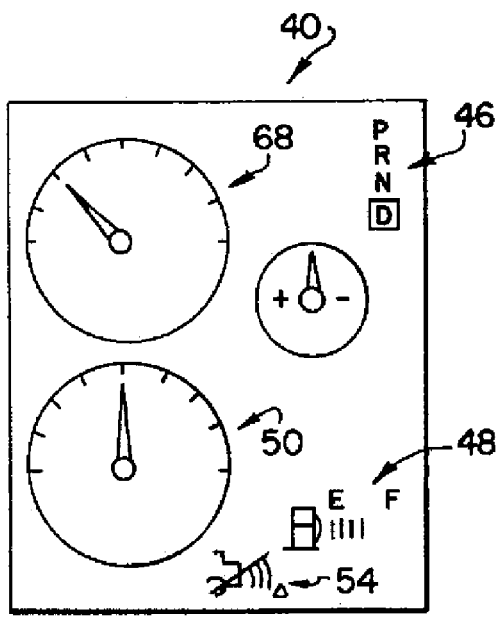
FIG. 4
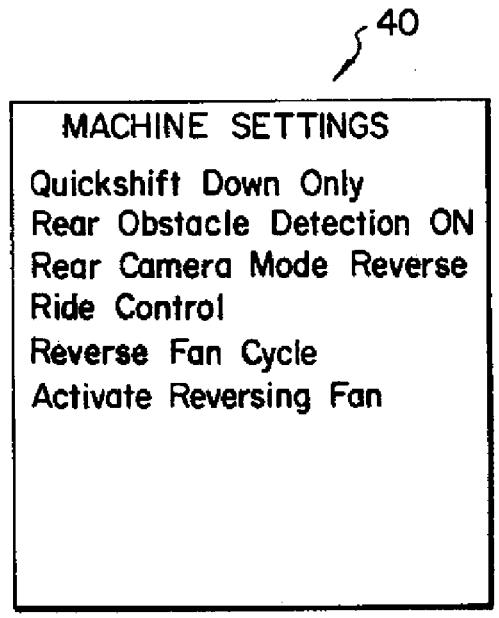
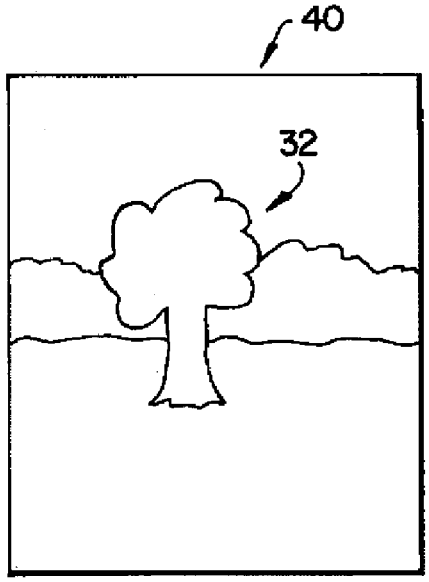
FIG. 5
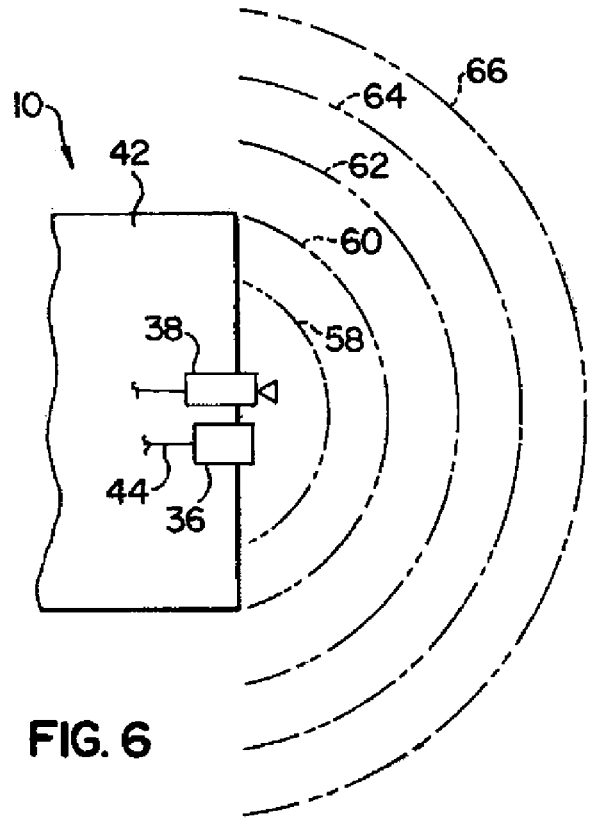
FIG. 6

CONSTRUCTION VEHICLE WITH REAR OBJECT DETECTION

CROSS-REFERENCE TO RELATED APPLICATIONS

The present application claims the benefit of U.S. Provisional Application Ser. No. 61/035,543, filed Mar. 11, 2008, titled "Construction Vehicle With Rear Object Detection," to Pfohl et at., the disclosure of which is expressly incorporated by reference herein.

FIELD OF THE INVENTION

The present disclosure relates to a vehicle with rear object detection.

BACKGROUND OF THE INVENTION

To assist operators in avoiding objects while backing up, construction vehicles may be provided with a camera and a monitor displaying images provided by the camera. The operator may watch the monitor to determine if an object is positioned behind the construction vehicle.

SUMMARY OF THE INVENTION

According to an aspect of the present invention, a vehicle is provided including a chassis; a plurality of traction devices positioned to support the chassis; a tool supported by the chassis to move material; an object detector supported by the chassis and configured to detect objects around the vehicle; a camera supported by the chassis; a monitor supported by the chassis and configured to output images provided by the camera; and a controller configured to modify the output the monitor based on input from the object detector.

According to another aspect of the present invention, a vehicle is provided including a chassis; a plurality of traction devices positioned to support the chassis; a tool supported by the chassis to move material; an object detector supported by the chassis and configured to detect objects around the vehicle; a monitor supported by the chassis; and a controller configured to control the output of the monitor. The controller has a first mode in which the monitor at least displays operational information of the vehicle. The controller is configured to modify the output of the monitor based on input from the object detector.

According to another aspect of the present invention, a vehicle is provided including a chassis; a plurality of traction devices positioned to support the chassis; a tool supported by the chassis to move material; an object detector supported by the chassis and configured to detect objects around the vehicle; an alarm providing an alarm signal to an operator of the vehicle indicative of an object being detected by the object detector; and a controller configured to receive input from the object detector and alter the alarm signal of the alarm based on the detected distance of the detected object.

According to another aspect of the present invention, a vehicle is provided including a chassis; a plurality of traction devices positioned to support the chassis; a tool supported by the chassis to move material; and means for displaying at least one object positioned behind the chassis based on detection of the at least one object.

According to another aspect of the present invention, a vehicle is provided including a chassis; a plurality of traction devices positioned to support the chassis; a tool supported by the chassis to move material; a n object detector supported by the chassis and configured to detect objects around the vehicle; a camera supported by the chassis; a monitor supported by the chassis and configured to output images provided by the camera; an audible alarm, and a controller configured to activate the audible alarm and modify the output the monitor based on input from the object detector.

BRIEF DESCRIPTION OF THE DRAWINGS

The above-mentioned and other features of the present disclosure will become more apparent and will be better understood by reference to the following description of embodiments of the present disclosure taken in conjunction with the accompanying drawings, wherein:

FIG. 3 is a view of a monitor of the rear object detection system showing an image providing operational information of the loader;

FIG. 4 is a view similar to FIG. 3 showing a menu;

FIG. 5 is a view similar to FIG. 3 showing an image provided by a camera of the rear object detection system; and FIG. 6 is a top plan view of a rear end of the loader showing a plurality of detection zones.

Figure 1:
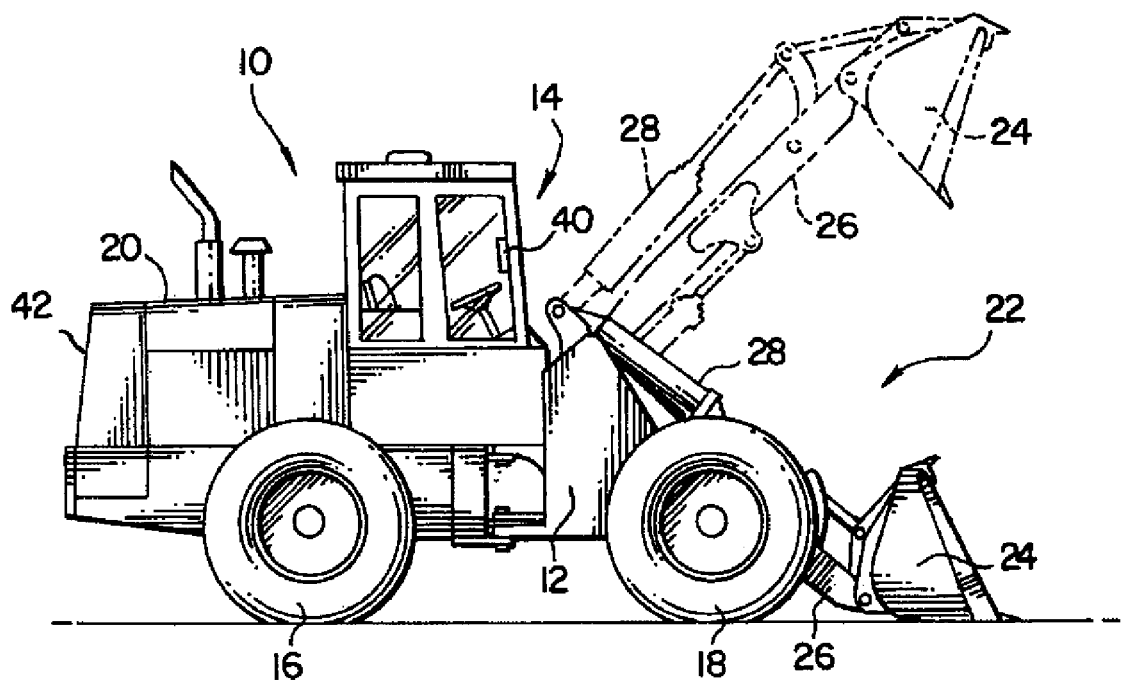
FIG. 1 is a side elevation view of a loader.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Loader 10 is shown in FIG. 1 for scooping and dumping material. Loader 10 includes articulated chassis 12, operator cab 14 supported by chassis 12, pair of rear wheels 16, also described as traction devices, to propel chassis 12 and the remainder of loader 10, pair of front wheels 18, which may also be described as traction devices and may also propel loader 10, engine 20 to power operation of loader 10, a transmission (not shown) transmitting power from engine 20 to rear wheels 16, and boom assembly 22. Boom assembly 22 includes bucket 24, boom linkages 26, and lift cylinders 28.

Although a loader is described in detail, the features described herein may be provided on other vehicles such as bull dozers, motor graders, and other construction vehicles having various construction tools and traction devices, such as wheels and tracks. The vehicle may also be an agricultural vehicle, such as a tractor, combine, or other agriculture vehicle. Bucket 24 is described as a construction tool that scoops and dumps materials, such as dirt, sand, gravel, salt, snow, and other materials. Other tools, such as blades, pallet forks, bail lifts, augers, plows, trailers, planters, corn heads, cutting platforms, and other tools may also be provided to move materials.

Figure 2:
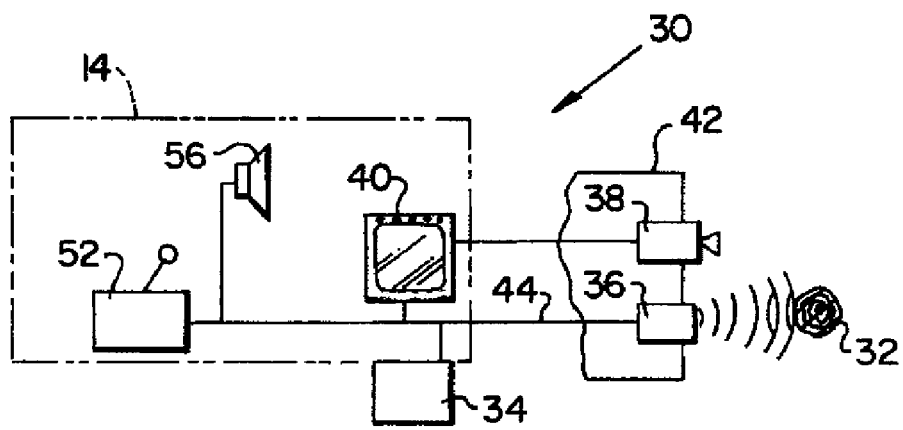
FIG. 2 is a schematic view of components of a rear object detection system of the loader.

As shown in FIG. 2, loader 10 includes object detection system 30 that detects objects 32 located within a range of loader 10. Object detection system 30 includes controller 34, object detector 36, camera 38, and monitor 40. Object detector 36 and camera 38 are mounted at rear end 42 of loader 10. Monitor 40 is positioned within operator cab 14 in a location viewable by the operator. Based on instructions and logic, controller 34 controls what monitor 40 displays. In addition to controlling monitor 40, controller 34 may control other functions of loader 10, such as engine 20, the transmission, and any electronic components of loader 10. The components of object detection system 30 communicate over CAN network 44 of loader 10, except that camera 38 is wired directly to monitor 40.

Object detector 36 sends a detection signal from rear end 42 of loader 10 and receives reflections of the detection signal to detect object 32. According to the preferred embodiment of the present disclosure, object detector 36 is a radar that send an electromagnetic signal and receives reflections of the electromagnetic signal to detect object 32. According to alternative embodiments of the present disclosure, other object detectors are provided such as sonar systems, ultrasound systems, and other object detectors.

Object detector 36 sends output over network 44 to controller 34 indicative of the distance of object 32 from object detector 36. Controller 34 uses this output as an input to its control logic to modify the operation of object detection system 30. For example, during operation of loader 10, controller 34 may operate in several modes based in the inputs to its logic.

When in a first or standard mode shown in FIG. 3, controller 34 controls monitor 40 to display operational information of loader 10. While in this mode, monitor 40 may provide analog gear indicator 46 showing the selected gear of loader 10 (park, reverse, neutral, drive, etc.), analog fuel gauge 48 showing the amount of fuel in the fuel tank (not shown) of loader 10, analog tachometer 50 showing the speed or rpm of engine 20, analog speedometer 68 showing the speed of loader 10, or other indicators displaying operational information of loader 10, such as sensor and switch readings, transmission mode, engine temperature, oil pressure, battery charge, etc.

When in a second or camera mode shown in FIG. 5, controller 34 controls monitor 40 to display images provided by camera 38. The preferred logic of controller 34 uses operator preference, operator input, input from shifter 52 of loader 10, and input from object detector 36 to switch from the standard mode to the camera mode.

According to the preferred embodiment of the present disclosure, no operational information is displayed by monitor 40 when controller 34 is in the camera mode. Similarly, when controller 34 is in the standard mode, no camera images are displayed by monitor 40. However, according to an alternative embodiment, some operational information may be shown by monitor 40 in the camera mode and some camera images may be displayed by monitor 40 in the standard mode. In this embodiment, the emphasis of the camera mode remains on the camera image and the emphasis of the standard mode is on the operational information.

The operator may select between manual, reverse, object, and reverse/object modes to determine when controller 34 switches between the standard and camera modes. When in the manual mode, the operator may manually select when controller switches between the standard mode displaying the operational information and the camera mode displaying images from camera 38. When in reverse mode, controller 34 detects when the operator moves shifter 52 to reverse and switches to the camera mode displaying images from camera 38 regardless of whether object 32 is detected. When loader 10 is shifted out of reverse, controller 34 switches back to the standard mode displaying the operational information.

When in the object mode, controller 34 monitors input from object detector 36. When object detector 36 detects object 32, controller 34 switches to the camera mode. When object detector 36 no longer detects object 32, controller 34 switches back to the standard mode.

When in reverse/object mode, controller 34 detects when shifter 52 moves to reverse and object detector 36 detects object 32. When both conditions are met, controller 34 switches to the camera mode so that monitor 40 displays the image from camera 38. If either condition is not met, controller 34 switches back to the standard mode so that monitor 40 displays the operational information.

In addition to the standard and camera modes, controller 34 may also switch to a machine setting menu mode shown in FIG. 4. When controller 34 is in the machine setting menu mode, the signal to monitor 40 causes it to display a machine setting menu. When in the menu mode, the operator can select their preferences, such as the modes of controller 34 described above. Using one or more of a plurality of buttons at the top of monitor 40, the operator selects the mode of controller 34 including whether to disable the camera mode. After selecting the mode, controller 34 switches back to the standard or camera mode depending on operator's selection and the controller logic. Monitor 40 may also include icon 54 indicating the status of object detection system 30. If the operator disables the camera mode, icon 54 (FIG. 3) is on continuously. If the operator enables the camera mode, icon 54 is off indicating the system is operating properly or is not installed. If icon 54 is flashing, object detector 36 is not communicating with controller 34 or is communicating an error message.

In addition to causing monitor 40 display images from camera 38 during the object and reverse/object modes, controller 34 also activates an audible alarm to audibly alert the operator that object detector 36 has sensed object 32. Object detection system 30 includes speaker 56 (FIG. 2) that produces the alarm signal.

According to the preferred embodiment of the present disclosure, object detector 36 is configured to detect objects within different distances or zones. Depend on the zone in which object 32 is detected, speaker 56 will provide a different alarm signal. Thus, the alarm signal is dependent upon the distance of object 32 from rear end 42 of loader 10.

According to the preferred embodiment of the present disclosure, five zones are provided as shown in FIG. 6. When object 32 is within one of the zones, speaker provides a repeating pattern including a chirp or beep, or first segment, followed by silence, or second segment. As object 32 gets closer, the second, silent segment gets shorter so the chirp rate gets quicker as object 32 gets closer to object detector 36. The zones include five zones 58, 60, 62, 64, 66 of approximately 0-20%, 20%-40%, 40%-60%, 60%-80%, and 80%-100% of a predetermined activation range. According to the preferred embodiment, the predetermined activation range is 15 feet so that zones 58, 60, 62, 64, 66 are 0-3 feet, 3-6 feet, 6-9 feet, 9-12 feet, and 12-15. Thus, the 12-15 feet range has the slowest chirp rate and 0-3 feet has the fastest chirp rate, with little if any silence between chirps. The activation range may be adjusted by the operator through monitor 40 or otherwise. Because the audible alarm changes as object 32 gets closer, the operator gets a sense of how close object 32 is based on the audible signal.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle including
    a chassis;
    a plurality of traction devices positioned to support the chassis;
    a tool supported by the chassis to move material;
    an object detector supported by the chassis and configured to detect objects around the vehicle;
    a camera supported by the chassis and configured to capture an image of objects around the vehicle;

a monitor supported by the chassis and configured to output the image captured by the camera; and
a controller configured to modify the output of the monitor to increase perceptibility of the image captured by the camera based on input from the object detector.

2. The vehicle of claim 1, further comprising an alarm providing an alarm signal to an operator of the vehicle indicative of an object being detected by the object detector.

3. The vehicle of claim 2, wherein the controller is configured to receive input from the object detector and alter the alarm signal of the alarm based on the detected distance of the detected object.

4. The vehicle of claim 1, wherein the monitor is configured to display operational parameters of the vehicle and the modification of the output of the monitor results in a reduction of the display of the operational parameters of the vehicle.

5. The vehicle of claim 1, wherein the controller is configured to modify the output of the monitor by displaying images provided by the camera on the monitor after detection of an object by the object detector.

6. The vehicle of claim 5, wherein the controller is configured to modify the output of the monitor by replacing images provided by the camera with operational parameters of the vehicle after the object is no longer detected within a distance of the vehicle by the object detector.

7. The vehicle of claim 1, wherein the object detector is a radar.

8. The vehicle of claim 4, wherein the operational parameters of the vehicle include at least one of a selected gear, a fuel level, an engine speed, a vehicle speed, a transmission mode, an engine temperature, an oil pressure, and a battery charge.

9. A vehicle including
a chassis;
a plurality of traction devices positioned to support the chassis;
a tool supported by the chassis to move material;
a camera supported by the chassis and configured to capture an image of objects around the vehicle;
an object detector supported by the chassis and configured to detect objects around the vehicle and to determine a distance between at least one of the objects and the object detector;
a monitor supported by the chassis; and
a controller configured to control the output of the monitor, the controller having a first mode in which the monitor at least displays operational information of the vehicle, the controller being configured to modify the output of the monitor to increase perceptibility of the image captured by the camera based on the distance input from the object detector.

10. The vehicle of claim 9, wherein the controller has a second mode in which the monitor at least displays output from the camera, the controller switches between the first and second modes based on the input from the object detector.

11. The vehicle of claim 10, wherein the monitor is devoid of the operational information when the controller is in the second mode.

12. The vehicle of claim 10, wherein the controller has a third mode in which the monitor displays a menu.

13. The vehicle of claim 10, wherein a greater percentage of the monitor display is dedicated to the operational information when the controller is in the first mode than when the controller is in the second mode.

14. The vehicle of claim 13, wherein the monitor is devoid of output from the camera when the controller is in the first mode.

15. A vehicle including
a chassis;
a plurality of traction devices positioned to support the chassis;
a tool supported by the chassis to move material;
an object detector supported by the chassis and configured to detect objects around the vehicle;
an alarm providing an alarm signal including an audible component to an operator of the vehicle indicative of an object being detected by the object detector, the audible component including at least repeating first and second segments, the length of the segments being dependent on a detected distance of the detected object; and
a controller configured to receive input from the object detector and alter the alarm signal of the alarm based on the detected distance of the detected object.

16. The vehicle of claim 15, further comprising a monitor and camera, wherein the controller is configured to control a signal to the monitor including at least an output from the camera.

17. The vehicle of claim 15, wherein the first segment is audible and the second segment is substantially inaudible, and the length of the second segment decreases as the detected distance of the object decreases.

18. A vehicle including
a chassis;
a plurality of traction devices positioned to support the chassis;
a tool supported by the chassis to move material;
means for capturing an image of at least one object positioned behind the chassis; and
means for displaying the image of the at least one object positioned behind the chassis with increased perceptibility based on detection of the at least one object.

19. A vehicle of claim 18, wherein the display means includes a monitor, an object detector, and a controller receiving inputs from the monitor and the controller configured to control a signal provided to the monitor that determines the images displayed by the monitor.

20. A vehicle including
a chassis;
a plurality of traction devices positioned to support the chassis;
a tool supported by the chassis to move material;
an object detector supported by the chassis and configured to detect objects around the vehicle;
a camera supported by the chassis and configured to capture an image of objects around the vehicle;
a monitor supported by the chassis and configured to output the image captured by the camera;
an audible alarm, and
a controller configured to alter the audible alarm and modify the output of the monitor based on input from the object detector.

21. The vehicle of claim 20, wherein the audible alarm includes at least repeating first and second segments, the length of the segments being dependent on a detected distance of the detected object.

22. The vehicle of claim 21, wherein the first segment is audible and the second segment is substantially inaudible, and the length of the second segment decreases as the detected distance of the object decreases.

* * * * *